Dec. 19, 1950
C. R. CARKEEK
2,534,853
CASCADE CATALYST SYSTEM
Filed Nov. 29, 1947
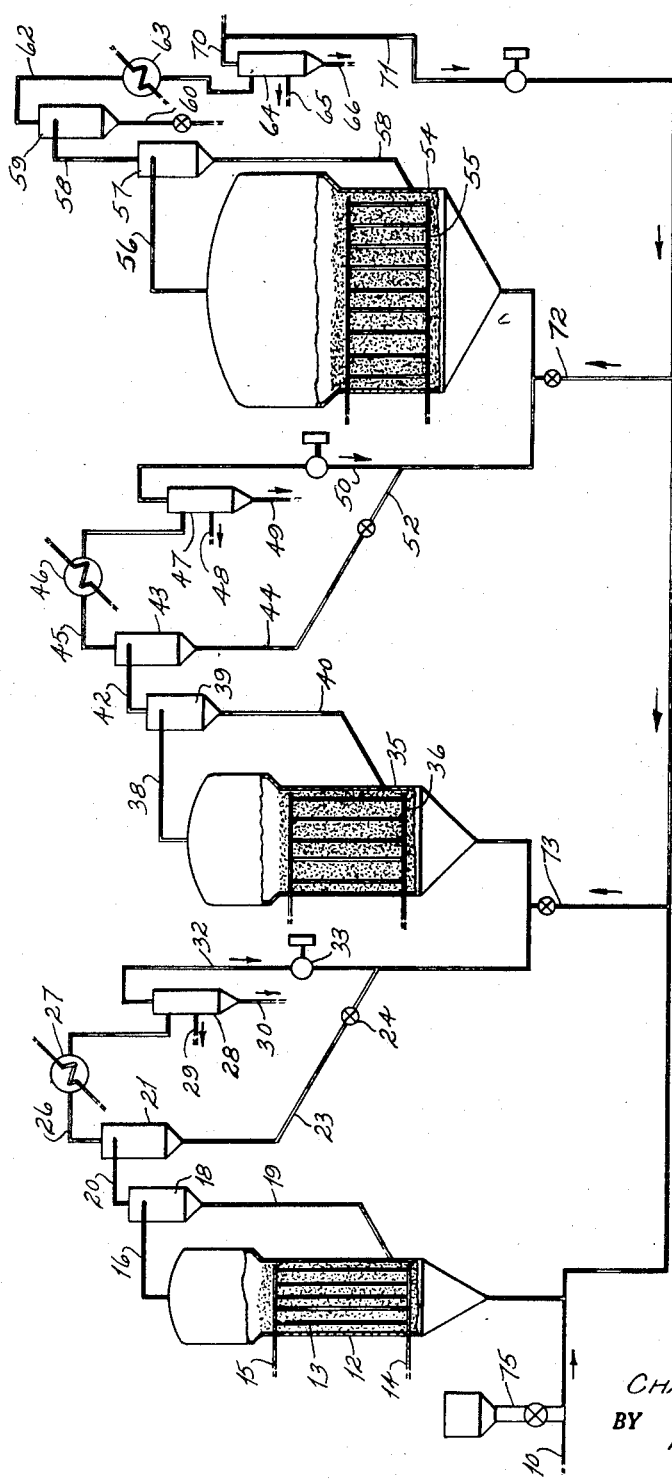
INVENTOR.
CHARLES R. CARKEEK
BY
ATTORNEYS Patented Dec. 19, 1950

2,534,853

UNITED STATES PATENT OFFICE 2,534,853

CASCADE CATALYST SYSTEM

Charles R. Carkeek, Pasadena, Calif., assignor to The Texas Company, New York, N. Y., a corporation of Delaware Application November 29, 1947, Serial No. 788,887

8 Claims. (Cl. 260—449.6)

The present invention relates to the conversion of gasiform reactants in the presence of fluid, solid particle powdered catalyst. It is more particularly concerned with processes wherein the catalyst comprises a typical powdered catalyst of more or less complete particle size distribution beginning with selected maximum particles, as for example, 100 mesh or even as great as 30 mesh, and progressing downwardly to the finest particle size to which the powder is usually comminuted, as for example 10 microns.

In accordance with the present invention, the solid particle catalyst powder, comprising several ranges of particle size, is distributed between a plurality of reaction zones, each operating under an appropriate predetermined linear velocity of reactant upflow, effective to fluidize a specific range of particle sizes, and to carry overhead finer particles. Thus each successive reaction zone is subjected to a reactant flow effective to place a successively lower range of particle sizes in desired dense phase condition. The finer particles below each such range are carried out of that reaction zone by the upflowing reactants and deposited in a succeeding reaction zone operating at a relatively lower rate of reactant upflow.

Preferably, the linear velocity of reactant upflow in each of the several reaction zones is selected so that the ranges of particle size covered by the aggregate of the several zones includes the entire range of catalyst powder employed. In this way, each reaction zone is predominantly occupied by a relatively narrow size range of particles and is operated under conditions most appropriate to fluidization and catalytic contact within that range.

Moreover, the progressively smaller particles which usually occur during the course of the reaction, as they reach the lower particle size limit for each reaction zone, are carried over into the next succeeding reaction zone where they are fluidized under the lower linear velocity of reactant upflow, and remain until further disintegration has reduced them to a predetermined particle size, at which carryover again occurs into the next succeeding reaction zone.

It is for this reason that the present invention is particularly applicable to processes such as the synthesis of hydrocarbons by the catalytic interaction of carbon oxide and hydrogen in the presence of a catalyst containing a metal of the iron group or ruthenium, at elevated temperatures and usually under superatmospheric pressures. This follows because of the fact that under the conditions where relatively high yields of normally liquid products are realized, there occurs a progressive spalling or disintegration of the powder into particles of decreasing size. This is particularly true in connection with hydrocarbon synthesis operations employing iron containing catalysts and within the range of operating temperatures, as for example, 500 to 700° F., being pronounced at temperatures above 600° F., as 625° F., 650° F. and higher.

Thus, as the particles of catalyst of decreasing particle size progressively pass through successive reaction zones under successively decreasing velocities of reactant flow, the initial reaction zone may be correspondingly continuously or periodically supplemented with fresh catalyst powder. Addition of make-up catalyst in this way, with discharge of only the ultimate fines from the final reaction zone under a suitably low rate of reactant upflow, results in discard of only those particles no longer suitable for fluid catalytic use. In short, the invention contemplates the utilization of catalytic particles of widely varying particle size under reaction such that all useful catalyst particles are fluidized under more optimum rates of reactant flow at which contact is improved, complete catalyst utilization is realized, and spent particles together with inerts, such as carbon, are continuously withdrawn from the system.

As contrasted with hitherto proposed methods of operation, the carryover of finer particles is substantially reduced, and while some carryover and recirculation may be effected as a means of promoting catalyst admixing and uniformity in each reaction zone, nevertheless carryover can be readily limited to an amount which may be reasonably handled by ordinary separating means such as a cyclone. Where, however, the entire broad range of catalyst particle sizes is included within a single reaction zone, unless the throughput of reactants is decreased to a very low value, the carryover of catalyst may be excessive and must necessarily be continuously returned to the reaction zone unless an uneconomical loss of catalyst is to be experienced.

The invention, in addition to improved catalyst utilization, permits an overall increase in yield of product due to the increased throughput which becomes practicable in the reaction zones containing catalyst of larger ranges of particle size.

The gasiform reactant feed may pass through the several reaction zones in stagewise series relationship, or may be divided into a series of feed streams passing through the respective zones in parallel.

Series staged operation of the several reaction zones is particularly advantageous in that as the reactants are consumed the stream successively meets catalyst of progressively diminishing fineness, and accordingly, of increased active surface area. As a result, there is "clean-up" or consumption of the reactants, which closely approaches complete reaction and contrasts favorably with hitherto proposed operations, employing comparable quantities of catalyst.

In other words, contact of the progressively less concentrated reactant stream, with successive masses of catalyst particles of decreasing size, in a manner analogous to countercurrent operations, effects an increased conversion of reactants and an improved product yield on the basis of a given quantity of catalyst in the reaction zones.

Where the stream of reactants passes through the reaction zones in parallel flow this advantage is not available and it is usually necessary to provide for a somewhat increased contact time by increasing bed depth particularly in the coarser particle zones. However, irrespective of the course of reactant flow, the catalyst, as shown above, is effectively utilized down to the ultimate particle size without loss or the necessity for excessive uneconomical carryover, recovery and circulation.

In accordance with the present invention, any desired number of reaction zones are provided with suitable separating means such as cyclones or magnetic or electrostatic separators, so arranged as to direct entrained particles into the succeeding reactor. The rate of reactant upflow in each reactor in each zone is adjusted so as to effectively fluidize particles within the respective size range.

Provision may be made for separately recovering particles of greater than the minimum limit of the respective size range for recirculation to the reaction zone and introducing only the smaller particles to the succeeding zone. Likewise, provision may be made for a controlled, limited return of fine particles to promote fluidization. In any event, during settled operation, the carryover of particles is essentially limited to that resulting from progressive disintegration plus any predetermined amount of particles desired for controlled catalyst circulation.

One embodiment of the present invention is disclosed more or less diagrammatically in the accompanying drawing for the purpose of more particularly illustrating the application of the present invention.

Therein the numeral 10 indicates a conduit directing synthesis gas, from a source not shown, into the lower portion of an upstanding reactor 12, containing a mass of powdered catalyst, surrounding cooling surfaces in the form of an exchanger 13 to which a coolant is supplied as at 14 and withdrawn as at 15.

The upflowing reactant gas serves to maintain the catalyst particles in the dense fluid phase leaving the upper pseudo-liquid surface of the fluid phase and being withdrawn through the reactor through outlet pipe 16. Pipe 16 discharges into a cyclone 18, so constructed as to separate particles of predetermined, relatively coarse size, and return them through standpipe 19 to the reactor 12. The overhead passes through pipe 20 to a second cyclone 21, wherein the residual fine particles are separated and drop through standpipe 22, controlled by feeder 24.

The separated gases pass by way of pipe 26 and condenser 27 to separator 28, where normally liquid products of reaction separate into oil and water layers and are removed as at 29 and 30 respectively. The normally gaseous residue, comprising unreacted hydrogen and carbon monoxide, passes overhead from the separator through pipe 32 and pump 33, picking up the catalyst particles from standpipe 23, as indicated, and flowing into the second reactor 35. Therein the reaction proceeds further under the influence of the relatively smaller particle size range of catalyst separated in the cyclone 21, and under the temperature control afforded by the cooling surfaces of heat exchanger 36, similar to the aforementioned exchanger 13.

The effluent gasiform product from reactor 35 passes thru pipe 38 to cyclone 39, where particles larger than the predetermined minimum of the size range to be retained by reactor 35 are returned through standpipe 40. The overhead gases, with entrained finer particles, pass through pipe 42 to cyclone 43, from where the solids are directed into standpipe 44, and the residual gases pass through pipe 45 and condenser 46 to second separator 47 where recovery is made of oil and water layers as at 48 and 49. The relatively lean stream of reactants from separator 47 passes through pipe 50, picks up the fine catalyst from standpipe 52, and flows into the third reactor 54, where the reaction is completed in the presence of a dense phase catalyst of the finest particle size under temperature control by the cooling surfaces of exchanger 55. The final gasiform product from the third reactor passes through outlet pipe 56 to cyclone 57 where particles, for example, down to 10 microns, are separated and returned to the reactor 57 through standpipe 58. The gaseous stream continues through pipe 58 to a second cyclone 59, discarding ultimate fines through standpipe 60. Clarified gas from cyclone 59 is conveyed by way of pipe 62 and condenser 63 to separator 64 from which the final oil layer is recovered as at 65 and water layer as at 66.

The wet tail gas may be discarded through outlet pipe 70 or else recycled at any desired rate to the fresh feed inlet pipe 10 by way of recycle line 71. Provision is made in the form of valved branch pipes 72 and 73 to permit selective introduction of recycle gas into the feed to the second and third reaction zones.

As clearly indicated, the several reactors of the selected embodiment, are of progressively increasing transverse area so that the linear velocity of upflow of reactants in each reaction zone progressively decreases in accordance with a predetermined pattern. As a result, particles which are entrained in the effluent from each preceding reaction zone will be retained in the succeeding zone at the relatively lower upflow prevailing therein. This follows from the fact that the range of particle size which tends to be retained in each particle zone is a function of the linear upflow velocity of gas.

In operation, a typical powdered catalyst, having a more or less uniform distribution of particles down to the lowest particle size is supplied to the reactor 12 and under the influence of the substantial flow of reactants, particles smaller than a predetermined range of size pass with the product through cyclone 18 and are discharged into the second reactor 35 by way of standpipe 33 and inlet pipe 32. Therein, a lower, predetermined velocity of upflow tends to retain a somewhat smaller predetermined size range of catalyst particles, the remainder again being carried overhead through cyclone 39 to cyclone 43 and passing by way of standpipe 44 and inlet pipe 50 to third reactor 35. Therein, the rate of upflow is preferably so adjusted as to retain all but the final particles which are of such minute size as to be unsuitable for fluidization, and are discharged through outlet pipe 60. Accordingly, by proper selection of linear velocities in each reactor, any relative distribution of catalyst particles may be made between the several reactors.

Provision is made for introducing additional catalyst through standpipe 75 into the inlet feed of reactor 12 in order to replenish the carryover of fines and effect a proper ultimate distribution between the several reactors.

Alternately, it is, of course, possible to initially charge the several reactors with catalyst of the appropriate particle size. In any event, however, the progressive diminution in particle size discussed above, results in continuous distribution of the particles as above with successive catalyst utilization in each of the several reactors until disintegration has progressed to a point where use is no longer practical.

So also, by addition of makeup catalyst through inlet pipe 75, the entire system may be maintained in continuous operation under substantially settled conditions of overall catalyst activity. Moreover, relatively high linear velocities of reactant flow may be set up in the first and second reactors, far above those which could be practical where a typical powdered catalyst of the broad range of particle size is used. However where, as indicated, the partially reacted stream of reactants successively meets catalyst masses of diminishing particle size catalyst consumption of available reactants is substantially complete with a corresponding realization of high yields of hydrocarbon products.

In accordance with one specific example, a system identical with that shown in the drawing, employing upstanding cylindrical reaction zones, is supplied with a fresh feed stream of synthesis gas comprising essentially hydrogen and carbon oxide in the molar ratio of 2:1 and effluent normally gaseous products from the third or final reactor, after separation of the normally liquid products are recycled to the inlet stream of the first reactor at a 1.5:1 standard volume recycle ratio. Temperatures in the several reactors are maintained substantially at 625° F. The system is held under a pressure of about 300 pounds per square inch gauge. The catalyst comprises powdered mill scale containing about 2 per cent alumina and about 1 per cent $K_2O$, having a substantially even distribution of particles from about 50 mesh down to less than 10 microns in diameter.

The catalyst is distributed in dense fluid phase approximately equally between the three reactors, under respective conditions of reactant upflow (expressed as standard linear velocity of upflow at the lower portion of the cylinder, neglecting the volume occupied by catalyst particles), and approximate ranges of particle size as follows:

*Reaction zone*

| | First | Second | Third |
|---|---|---|---|
| linear velocity (ft./sec.) | 16 | 4 | 1 |
| catalyst particle size (microns) | Greater than 80 | 80–40 | 40–10 |

Under these conditions, the combined oil layers recovered from the separators following each stage amounts to about 12.4 pounds of hydrocarbons boiling predominantly in the motor gasoline range, per thousand cubic feet of fresh feed gas.

The final tail gas contains essentially carbon dioxide, methane, ethane, and ethylene, approximately as follows, expressed on the basis of carbon monoxide supplied in the feed gas:

|  | Per cent |
|---|---|
| $CH_4$ | 5 |
| $C_2$'s | 8 |
| $CO_2$ | 4 |

In contrast, where the same quantity of identical catalyst is deposited within a single reactor, it is impossible to raise the linear velocity of the reactant gas stream above about 1 foot per second without excessive carryover of fine catalyst, and under conditions identical as to temperature, pressure and recycle ratio, the yield of liquid hydrocarbons amounts to only about 10 pounds of liquid hydrocarbons per thousand cubic feet of fresh feed synthesis gas. Similarly, the final product or tail gas shows a yield of undesired gases (on the same basis as above) as follows:

|  | Per cent |
|---|---|
| $CH_4$ | 6 |
| $C_2$'s | 10 |
| $CO_2$ | 18 |

As indicated above, cyclones 18, 39 and 57 permit a somewhat greater throughput of reactants with a limited circulation of catalyst to each reactor, to enhance fluidization. In furtherance of this object, provision may be made for returning small controlled quantities of catalyst from a succeeding reactor to a preceding reactor. However, at somewhat reduced reactant throughput where carryover is restricted essentially to fines smaller than the lower limit of the range selected for each reactor, the aforementioned cyclones may be omitted.

It is to be noted that the intermediate condensation and separation of normally liquid products between the several reactors decreases the total volume of gas passing through the subsequent reactors and thus contributes to compactness of later stage reaction zones. Thus in the specific embodiment described, the final reactor may be substantially smaller in transverse dimension than would be required for a single reactor handling the same production. However, many important advantages of the invention are available in connection with hydrocarbon synthesis, for example, where intermediate condensation and separation is not practiced. These include such things as, the progressive contact between increasingly depleted or lean reactants and relatively finer catalyst, the saving in capital investment due to the inherent volume contraction which occurs in hydrocarbon synthesis, economical catalyst utilization, and the like.

Obviously many modifications and variations of the invention, as hereinbefore set forth, may be made without departing from the spirit and scope thereof and, therefore, only such limitations should be imposed as are indicated in the appended claims.

What I claim is:

1. In the process of catalytic conversion wherein a gaseous reactant stream is passed upwardly through a fluid phase, solid particle catalyst powder, comprising a plurality of different ranges of particle size, and the effluent reaction products are withdrawn from contact with the catalyst, the steps which comprise distributing said catalyst powder in a plurality of reaction zones such that each of said zones contains catalyst having a different, predetermined range of particle size, continuously passing reactant gas through each of said reaction zones at a predetermined rate of linear flow at which catalyst within each respective range of particle size is essentially retained in a dense fluid phase condition within its reaction zone, while particles below said respective range of particle size are entrained in the effluent product stream, recovering from the effluent product stream said entrained catalyst particles below said respective range of particle size, directing thus recovered particles into a reaction zone containing catalyst of a lower range of particle size than the respective range of particle size retained in the reaction zone from which said effluent product stream was withdrawn, and recovering desired products of reaction from the effluent of said reaction zones.

2. In the process of catalytic conversion wherein the gaseous reactant stream is passed upwardly through a fluid phase, solid particle catalyst powder, comprising a plurality of successive ranges of particle size, and the effluent reaction products are withdrawn from contact with the catalyst, the steps which comprise disposing said catalyst powder in a reaction zone, continuously passing reactant gas upwardly through said reaction zone at a predetermined linear rate of reactant flow such that particles greater than a predetermined particle size are essentially retained within said reaction zone in a dense phase fluid condition, while particles in the ranges below said predetermined particle size are entrained in the effluent product stream, recovering from the effluent product stream said entrained catalyst particles in the ranges below said predetermined particle size, directing such recovered particles into a second reaction zone, passing reactant gas upwardly through said second reaction zone at a predetermined lower linear rate of velocity at which said recovered catalyst particles are essentially retained in a dense fluid phase condition in said reaction zone without substantial entrainment, and recovering desired products of reaction from the effluent of said reaction zones.

3. In the process for the catalytic synthesis of hydrocarbons, wherein a synthesis gas comprising hydrogen and carbon oxide is passed upwardly through a fluid phase, solid particle catalyst powder, comprising a plurality of different successive ranges of particle size, effective for the reduction of carbon oxide by hydrogen with production of hydrocarbons, oxygenated hydrocarbons and the like, and the effluent stream of reaction products is withdrawn from contact with the catalyst, the steps which comprise distributing said catalyst powder in a plurality of reaction zones such that each of said zones contains catalyst having a different predetermined range of particle size, continuously passing synthesis gas through each of said reaction zones at a predetermined linear rate of flow at which catalyst within each respective range of particle size is essentially retained within the reaction zone in a dense fluid phase condition while particles below said respective range of particle size are entrained in the effluent product stream, recovering from the effluent product stream said entrained catalyst particles below said respective range of particle size, directing thus recovered particles into a reaction zone containing catalyst of a lower range of particle size than the respective size range contained in the reaction zone from which said effluent product stream was withdrawn and recovering desired products of reaction from the effluent of said reaction zones.

4. In the synthesis of hydrocarbons by passage of a mixture of hydrogen and carbon monoxide in contact with dense fluid phase catalyst comprising particles of relatively widely varying particle size under reaction conditions including an elevated temperature at which progressive disintegration of the catalyst occurs, the improvement which comprises distributing catalyst in a plurality of reaction zones such that each of said reaction zones contains a catalyst fraction having a different, predetermined range of particle size, separately subjecting each of said fractions in its respective reaction zone to contact with an upflowing stream of synthesis gas comprising hydrogen and carbon monoxide, maintaining within each reaction zone reaction conditions effective for the production of substantial quantities of desired products of reaction, withdrawing from the upper surface of each fraction an effluent product stream containing said desired products of reaction, maintaining a rate of upflow of said reactants within each reaction zone such that particles of each fraction are predominantly retained within the respective reaction zone in the form of a dense fluid phase, while particles smaller than said fraction are carried out of the upper surface of said dense fluid phase by entrainment in the effluent product stream, recovering desired products of reaction from the effluent product stream and conveying entrained smaller particles into a reaction zone containing a catalyst fraction which includes particles of corresponding size.

5. In the synthesis of hydrocarbons by passage of a mixture of hydrogen and carbon monoxide in contact with dense fluid phase catalyst comprising particles of relatively widely varying particle size under reaction conditions including an elevated temperature at which progressive disintegration of the catalyst occurs, substantially reducing the amount of catalyst carryover by distributing said catalyst in a plurality of reaction zones such that each of said reaction zones contains a catalyst fraction having a different, relatively narrow, predetermined range of particle size, separately passing through each of said fractions in its respective reaction zone an upwardly flowing reactant stream of gas comprising hydrogen and carbon monoxide, withdrawing the effluent reactant stream from the upper portion of the reaction zone after contact with the catalyst fraction, maintaining the rate of upflow of said reactant stream within each reaction zone such that particles of the respective fraction are predominantly retained therein as a dense fluid phase having an upper pseudo-liquid surface from which particles smaller than said fraction are withdrawn by entrainment in the effluent stream, maintaining reaction conditions within each reaction zone effective for substantial conversion of reactants into desired products of reaction, treating the effluent product stream withdrawn from at least one of said reaction zones for the separation of entrained catalyst particles from the desired products of reaction, conveying said separated catalyst particles into a reaction zone containing a catalyst fraction which includes particles of corresponding size and recovering said desired products of reaction.

6. In the synthesis of hydrocarbons by passage of a mixture of hydrogen and carbon monoxide in contact with dense fluid phase catalyst comprising particles of relatively widely varying particle size under reaction conditions including an elevated temperature at which progressive disintegration of the catalyst occurs, the improvement which comprises distributing catalyst in a plurality of reaction zones such that each of said reaction zones contains a catalyst fraction having a different, predetermined range of particle size, separately subjecting each of said fractions in its respective reaction zone to contact with an upflowing stream of synthesis gas comprising hydrogen and carbon monoxide, maintaining within each reaction zone reaction conditions effective for the production of substantial quantities of desired products of reaction, withdrawing from the upper surface of each fraction an effluent product stream containing said desired products of reaction, maintaining a rate of upflow of said reactants within each reaction zone such that particles of each fraction are predominantly retained within the respective reaction zone in the form of a dense fluid phase, while particles smaller than said fraction are carried out of the upper surface of said dense fluid phase by entrainment in the effluent product stream, and conveying entrained smaller particles into a reaction zone containing a catalyst fraction which includes particles of corresponding size.

7. In the process for the catalytic synthesis of hydrocarbons, wherein a synthesis gas comprising hydrogen and carbon oxide is passed upwardly through a fluid phase, solid particle catalyst powder, comprising a plurality of different successive ranges of particle size, effective for the reduction of carbon oxide by hydrogen with production of hydrocarbons, oxygenated hydrocarbons and the like, and the effluent stream of reaction products is withdrawn from contact with the catalyst, the steps which comprise distributing said catalyst powder in a plurality of reaction zones such that each of said zones contains catalyst having a different predetermined range of particle size, continuously passing synthesis gas through each of said reaction zones at a predetermined linear rate of flow at which catalyst within each respective range of particle size is essentially retained within the reaction zone in a dense fluid phase while particles below said respective range of particle size are entrained in the effluent product stream, and directing said entrained particles below said respective range of particle size into a reaction zone containing a catalyst of a lower range of particle size than the respective range contained in the reaction zone from which the said effluent product stream was withdrawn.

8. In the fluid catalytic conversion of gasiform reactants wherein a gasiform reactant stream is passed upwardly in contact with a dense fluid phase, solid particle catalyst under reaction conditions to convert the reactant stream into desired products of reaction, the improvement which comprises simultaneously effecting said contact in a plurality of separate reaction zones, each containing a catalyst fraction of a different predetermined range of particle size, maintaining a linear rate of flow of gasiform reactant through each of said reaction zones such that the particles of the respective fraction are predominantly retained within the reaction zone in the form of a dense fluid phase while particles smaller than said fraction tend to be entrained in the effluent product stream withdrawn from the reaction zone, and directing such entrained particles into a reaction zone containing a catalyst fraction comprising particles of smaller particle size than the reaction zone from which said effluent product stream was withdrawn.

CHARLES R. CARKEEK.

REFERENCES CITED

The following references are of record in the file of this patent:

UNITED STATES PATENTS

| Number | Name | Date |
|---|---|---|
| 2,276,274 | Keith, Jr. | Mar. 17, 1942 |
| 2,349,574 | Conn | May 23, 1944 |
| 2,393,909 | Johnson | Jan. 29, 1946 |
| 2,406,851 | Redcay | Sept. 3, 1946 |
| 2,468,494 | Griffin, Jr. | Apr. 26, 1949 |